US011333068B1

(12) United States Patent
Savaria et al.

(10) Patent No.: US 11,333,068 B1
(45) Date of Patent: May 17, 2022

(54) SIDE WALL FOR ROTARY ENGINE HOUSING

(71) Applicant: PRATT & WHITNEY CANADA CORP., Longueuil (CA)

(72) Inventors: Vincent Savaria, Laval (CA); David Gagnon-Martin, Longueuil (CA); Johnny Vinski, Thâteauguay (CA); Sébastien Bolduc, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/209,504

(22) Filed: Mar. 23, 2021

(51) Int. Cl.
| *F02B 55/08* | (2006.01) |
| *F01C 1/22* | (2006.01) |
| *F01C 19/00* | (2006.01) |
| *F02B 53/00* | (2006.01) |
| *F01C 21/10* | (2006.01) |

(52) U.S. Cl.
CPC ............... *F02B 55/08* (2013.01); *F01C 1/22* (2013.01); *F01C 19/00* (2013.01); *F01C 21/104* (2013.01); *F02B 2053/005* (2013.01)

(58) Field of Classification Search
CPC .... F02B 55/08; F02B 2053/005; F01C 19/00; F01C 1/22; F01C 21/104
USPC ......... 277/357; 123/18 A, 18 R, 43 A, 45 A, 123/45 R, 200–249; 418/140, 187, 61.1; 60/39.55
See application file for complete search history.

(56) References Cited

U.S. PATENT DOCUMENTS

| 3,289,649 A | * | 12/1966 | Lamm ..................... F02B 77/02 418/178 |
| 3,393,667 A | * | 7/1968 | Jones ...................... F02B 53/12 123/205 |
| 3,512,907 A | | 5/1970 | Belzner |
| 3,705,818 A | * | 12/1972 | Grosseau ................ C23C 4/067 205/183 |
| 3,706,514 A | * | 12/1972 | Ruf ......................... F01C 19/10 418/104 |
| 3,820,513 A | * | 6/1974 | Buettner ................. F02B 53/00 123/222 |
| 3,833,320 A | * | 9/1974 | Telang ................... F01C 19/005 418/178 |

(Continued)

FOREIGN PATENT DOCUMENTS

JP          58200035 A  * 11/1983  ............ F01C 1/3441

*Primary Examiner* — J. Todd Newton, Esq.
(74) *Attorney, Agent, or Firm* — Norton Rose Fulbright Canada LLP.

(57) ABSTRACT

A housing for a rotary engine has: a peripheral wall defining two end faces and an inner face transverse to the two end faces; two side walls sealingly engaged to the two end faces of the peripheral wall, a core of a side wall of the two side walls having a core face, the core face having a cavity section facing the rotor cavity and an abutment section annularly extending around the cavity section, the abutment section facing an end face of the two end faces, the abutment section having a flared portion flaring away from the end face; and a coating on the core face, the coating made of a material harder than a material of the core of the side wall, the coating covering the cavity section and ending at a coating edge located on the flared portion, the coating edge free of contact with the end face.

17 Claims, 4 Drawing Sheets

(56) References Cited

U.S. PATENT DOCUMENTS

| | | | | |
|---|---|---|---|---|
| 3,833,321 | A * | 9/1974 | Telang | B23P 15/00 418/178 |
| 3,837,320 | A * | 9/1974 | Maekawa | F02B 55/08 123/242 |
| 3,918,137 | A * | 11/1975 | Telang | F01C 21/104 29/888.012 |
| 3,970,527 | A * | 7/1976 | Brown | C25D 1/00 29/527.3 |
| 3,981,688 | A * | 9/1976 | Telang | C23C 4/067 29/888.012 |
| 4,058,321 | A * | 11/1977 | Gavrun | F01C 19/08 277/357 |
| 4,758,139 | A * | 7/1988 | Yagii | C23C 4/06 29/458 |
| 2015/0292101 | A1 | 10/2015 | Gollasch et al. | |
| 2017/0306519 | A1 | 10/2017 | Beauvir et al. | |
| 2020/0200009 | A1 * | 6/2020 | Gagnon-Martin | F01C 21/06 |

\* cited by examiner

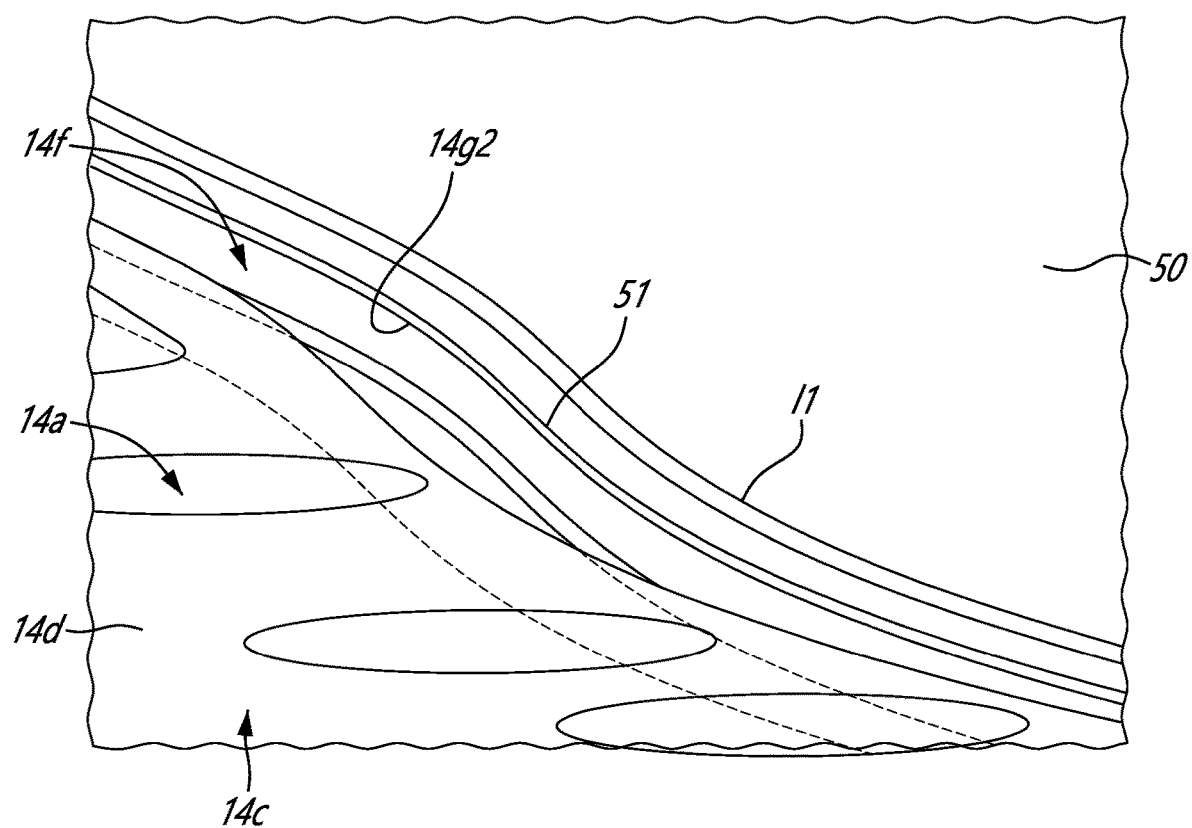

SIDE WALL FOR ROTARY ENGINE HOUSING

TECHNICAL FIELD

The application relates generally to internal combustion engines and, more particularly, to rotary internal combustion engines.

BACKGROUND OF THE ART

Combustion chambers of a rotary engine, such as a Wankel engine, are delimited radially by the rotor and by a housing including a peripheral wall and two side walls sealingly engaged to the peripheral wall. The side walls facing the combustion chamber are subjected to high pressure and thermal loads. On the other hand, the side walls must provide the running surface for the rotor's side seals.

SUMMARY

In one aspect, there is provided a housing for enclosing a rotor of a rotary internal combustion engine, the rotor rotatable about a rotation axis, the housing comprising: a peripheral wall extending around a rotor cavity, the peripheral wall defining two end faces axially spaced apart from one another relative to the rotation axis and an inner face transverse to the two end faces, the inner face facing the rotor cavity and extending axially between the two end faces; two side walls respectively sealingly engaged to the two end faces of the peripheral wall, a core of a side wall of the two side walls having a core face, the core face having a cavity section facing the rotor cavity and an abutment section annularly extending around the cavity section, the abutment section facing an end face of the two end faces of the peripheral wall, the abutment section having a flared portion flaring away from the end face; and a coating on the core face of the core of the side wall, the coating made of a material harder than a material of the core of the side wall, the coating covering the cavity section and ending at a coating edge located on the flared portion of the abutment section, the coating edge free of contact with the end face.

In some embodiments, the flared portion extends from a first edge to a second edge, the first edge overlapped by the end face.

In some embodiments, the end face extends from the inner face to an outer face, the outer face facing away from the rotor cavity, the first edge located between the inner face and the outer face and offset from the inner face.

In some embodiments, the peripheral wall has a peripheral core and a second coating on the peripheral core, the second coating made of a second material harder than a material of the peripheral core, the inner face of the peripheral wall defined by the second coating.

In some embodiments, the first edge of the flared portion is overlapped by the peripheral core, the first edge offset from an inner core face of the peripheral core, the second coating on the inner core face.

In some embodiments, the peripheral wall has a peripheral core and a second coating on the peripheral core, the second coating made of a second material harder than a material of the peripheral core, the inner face of the peripheral wall defined by the second coating, the coating on the flared portion of the abutment section being free of contact with the second coating.

In some embodiments, the side wall defines a groove extending from the abutment section away from the end face, the groove sized to receive a sealing member in the groove, the flared portion ending at the groove.

In some embodiments, the coating extends up to the groove.

In some embodiments, the flared portion is a chamfer or a roundover.

In some embodiments, a thickness of the coating decreases toward the coating edge.

In another aspect, there is provided a side wall for a housing of a rotary internal combustion engine, the housing defining a rotor cavity, the side wall sized to be sealingly engaged to an end face of a peripheral wall of the housing, the side wall comprising: a core defining a core face, the core face having a cavity section for facing the rotor cavity and an abutment section for facing the end face, the abutment section extending outwardly from the cavity section and extending around the cavity section, a flared portion of the abutment section flaring away from a plane containing the core face; and a coating on the core face of the core of the side wall, the coating made of a material harder than a material of the core of the side wall, the coating covering the cavity section and ending at a coating edge located on the flared portion of the abutment section.

In some embodiments, the flared portion extends from a first edge to a second edge, the first edge offset from an intersection between the cavity section and the abutment section.

In some embodiments, the intersection between the cavity section and the abutment section is located such that the first edge is overlapped by a peripheral core of the peripheral wall of the housing.

In some embodiments, the side wall defines a groove extending from the abutment section away from the plane containing the cavity section, the groove sized to receive a sealing member in the groove, the flared portion ending at the groove.

In some embodiments, the coating extends up to the groove.

In some embodiments, the flared portion is a chamfer or a roundover.

In some embodiments, a thickness of the coating decreases toward the coating edge.

In yet another aspect, there is provided a rotary internal combustion engine, comprising: a rotor rotatable about a rotation axis; and a housing defining a rotor cavity, the rotor received in the rotor cavity, the housing having: a peripheral wall extending around the rotor cavity, the peripheral wall defining two end faces axially spaced apart from one another relative to the rotation axis and an inner face transverse to the two end faces, the inner face facing the rotor cavity and extending axially between the two end faces, two side walls respectively sealingly engaged to the two end faces of the peripheral wall, a core of a side wall of the two side walls having a core face, the core face having cavity section facing the rotor cavity and an abutment section extending around the cavity section and facing an end face of the two end faces of the peripheral wall, and a coating on the core face of the side wall, the coating made of a material harder than a material of the core of the side wall, the coating covering the cavity section and ending at a coating edge, the coating edge distanced from the end face by a spacing defined between the abutment section and the end face.

In some embodiments, the side wall defines a groove extending around the rotor cavity, the groove receiving a sealing member in the groove, the abutment section having a flared portion extending away from the end face and ending at the groove.

In some embodiments, the coating, at the flared portion, is free of contact with a second coating of the peripheral wall, the second coating made of a material harder than a material of a core of the peripheral wall, the second coating defining the inner face of the peripheral wall. s

DESCRIPTION OF THE DRAWINGS

Reference is now made to the accompanying figures in which:

FIG. 5 is a three dimensional view of a portion of the side wall of FIG. 2.

DETAILED DESCRIPTION

Figure 1:
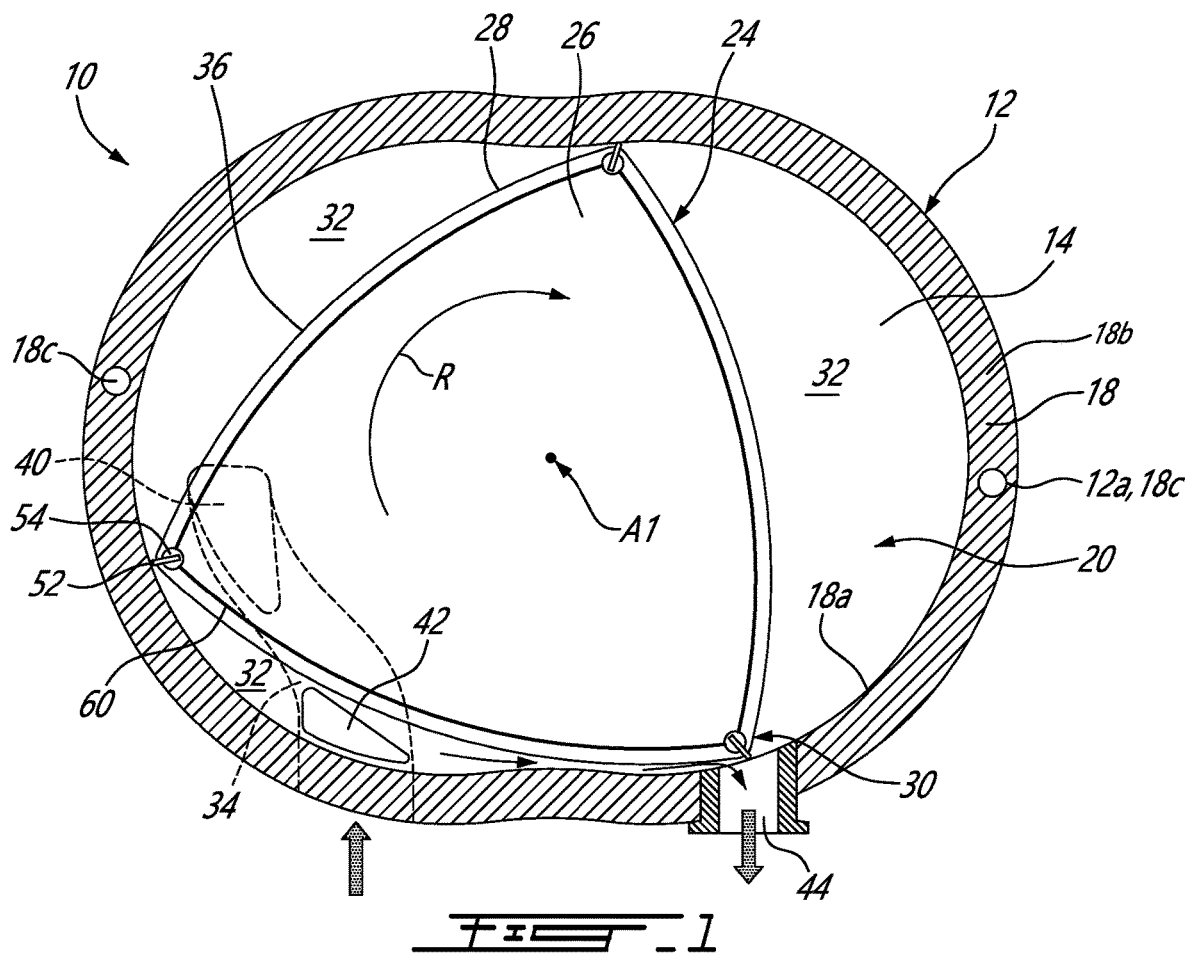
FIG. 1 is a schematic cross-sectional view of a rotary internal combustion engine in accordance with a particular embodiment.

Referring to FIG. 1, a rotary internal combustion engine referred to below as a rotary engine 10, which may be a Wankel engine, is schematically shown. The rotary engine 10 comprises an outer body 12 having side walls 14 that are axially-spaced from one another. The outer body 12 includes a peripheral wall 18 extending between the side walls 14 to form a rotor cavity 20. The rotor cavity 20 is circumscribed by the peripheral wall 18 and by the side walls 14 and extends between the side walls 14. An inner face 18*a* of the peripheral wall 18 faces the rotor cavity 20 has a profile defining two lobes, which may be an epitrochoid. The peripheral wall 18 has end faces 18*b* that are transverse to the inner face 18*a*. The inner face 18*a* extends from one of the end faces 18*b* to the other. The end faces 18*b* are in abutment against the side walls 14. A sealing engagement is defined between the side walls 14 and the peripheral wall 18.

An inner body or rotor 24 is received within the rotor cavity 20. The rotor 24 has end faces 26 axially spaced apart from one another and each facing a respective one of the side walls 14. The rotor 24 has a peripheral face 28 extending between the end faces 26 and facing the peripheral wall 18. The peripheral face 28 has apex portions 30, three in the embodiment shown, circumferentially-spaced apart from one another, and a generally triangular profile with outwardly arched sides 36. The apex portions 30 are in sealing engagement with the inner face 18*a* of peripheral wall 18 to create combustion chambers 32, three in the embodiment shown, between the rotor 24 and outer body 12. A geometrical axis of the rotor 24 is offset from and parallel to a central axis of the outer body 12. The combustion chambers 32 rotate in direction R about the geometrical axis or rotation axis A1.

The combustion chambers 32 are sealed. In the embodiment shown, the apex portions 30 of the rotor 24 have apex seals 52 each extending from one of the end faces 26 to the other of the end faces 26 and biased radially outwardly against the inner face 18*a* of the peripheral wall 18. End seals 54 engages ends of the apex seals 52 and are biased against the side walls 14. The end faces 26 of the rotor 24 have arc-shaped face seals 60 each running between two adjacent ones of the apex portions 30. The arc-shaped face seals 60 are adjacent to but located inwardly of a periphery of the rotor 24 along their lengths. The arc-shaped face seals 60 are in sealing engagement with the end seals 54 adjacent each end thereof and biased into sealing engagement with the side walls 14. Alternate sealing arrangements are also possible.

Although not shown in the Figures, the rotor 24 is journaled on an eccentric portion of a shaft such that the shaft rotates the rotor 24 to perform orbital revolutions within the rotor cavity 20. The shaft may rotate three times for each complete rotation of the rotor 24 as it moves around the rotor cavity 20. Oil seals are provided around the eccentric portion to impede leakage flow of lubricating oil radially outwardly thereof between the end faces 26 of the rotor 24 and the side walls 14. During each rotation of the rotor 24, each combustion chamber 32 varies in volumes and moves around the rotor cavity 20 to undergo the four phases of intake, compression, expansion and exhaust, these phases being similar to the strokes in a reciprocating-type internal combustion engine having a four-stroke cycle.

The engine includes a primary inlet port 40 in communication with a source of air, an exhaust port 44, and an optional purge port 42 also in communication with the source of air (e.g. a compressor) and located between the primary inlet port 40 and the exhaust ports 44. The primary inlet port 40, the optional purge port 42, and the exhaust port 44 may be defined in the side wall 14 or in the peripheral wall 18. In the embodiment shown, the primary inlet port 40 and the optional purge port 42 are defined in the side wall 14 and communicate with a same intake duct 34 defined as a channel in the side wall 14, and the exhaust port 44 is defined through the peripheral wall 18. Alternate configurations are possible without departing from the scope of the present disclosure.

In a particular embodiment, fuel such as kerosene (jet fuel) or other suitable fuel is delivered into the combustion chamber 32 through a fuel port (not shown) such that the combustion chamber 32 is stratified with a rich fuel-air mixture near the ignition source and a leaner mixture elsewhere, and the fuel-air mixture may be ignited within the housing using any suitable ignition system known in the art (e.g. spark plug, glow plug). In a particular embodiment, the rotary engine 10 operates under the principle of the Miller or Atkinson cycle, with its compression ratio lower than its expansion ratio, through appropriate relative location of the primary inlet port 40 and exhaust port 44.

Figure 2:
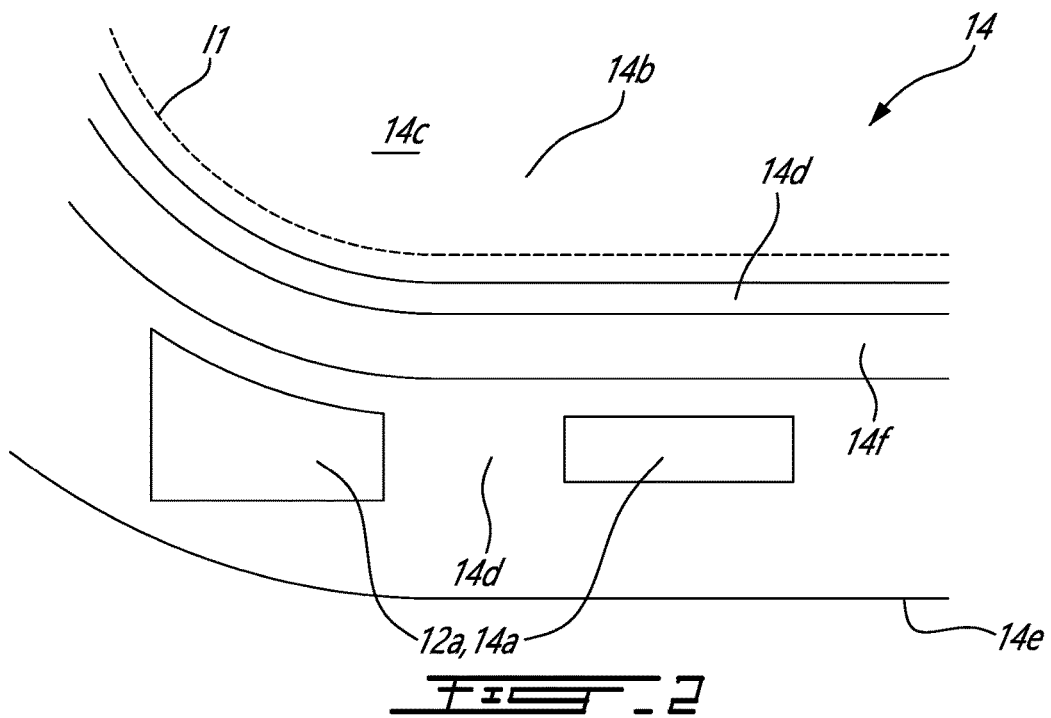
FIG. 2 is a schematic plan view of a portion of a side wall of a housing of the rotary internal combustion engine of FIG. 1.

Referring to FIGS. 1-2, the outer body 12 includes a coolant circuitry 12*a*, which may include peripheral coolant conduits 18*c* defined within the peripheral wall 18 and side coolant conduits 14*a* defined within the side walls 14. The peripheral coolant conduits 18*c* and the side coolant conduits 14*a* are in fluid flow communication with one another. The peripheral coolant conduits 18*c* extends from one of the side walls 14 to the other. The coolant circuitry 12*a* is used for circulating a coolant, such as water, to cool the outer body 12 during operation of the rotary engine 10. It is understood that the coolant conduits shown in the Figures are illustrative and that more or less conduits may be used without departing from the scope of the present disclosure.

A portion of one of the side walls 14 before being coated with a wear-resistant coating is shown in FIG. 2 and is described below using the singular form. The description below may be applied to both of the side walls 14. The side wall 14 has a core 14*b* that is made of aluminum or any other suitable material. The core 14b of the side wall 14 may be made of an aluminum alloy. The core 14b may be machined or may be casted. The core 14b may be made of cast iron or steel in some configurations. The core 14b has a core face. The core face has a cavity section 14c that faces the rotor cavity 20. The core 14b of the side wall 14 has an abutment section 14d that extends radially outwardly from the cavity section 14c relative to the rotation axis A1. The abutment section 14d annularly extends around the cavity section 14c and extends from an intersection I1 between the side wall 14 and the peripheral wall 18 and an outer periphery 14e of the side wall 14. The intersection I1 between the side wall 14 and the peripheral wall 18 is shown with a dashed line in FIG. 2. An outer periphery of the peripheral wall 18 may be aligned with the outer periphery 14e of the side wall 14. The intersection I1 is defined between an inner face 18a of the peripheral wall 18 and the side wall 14.

Figure 3:
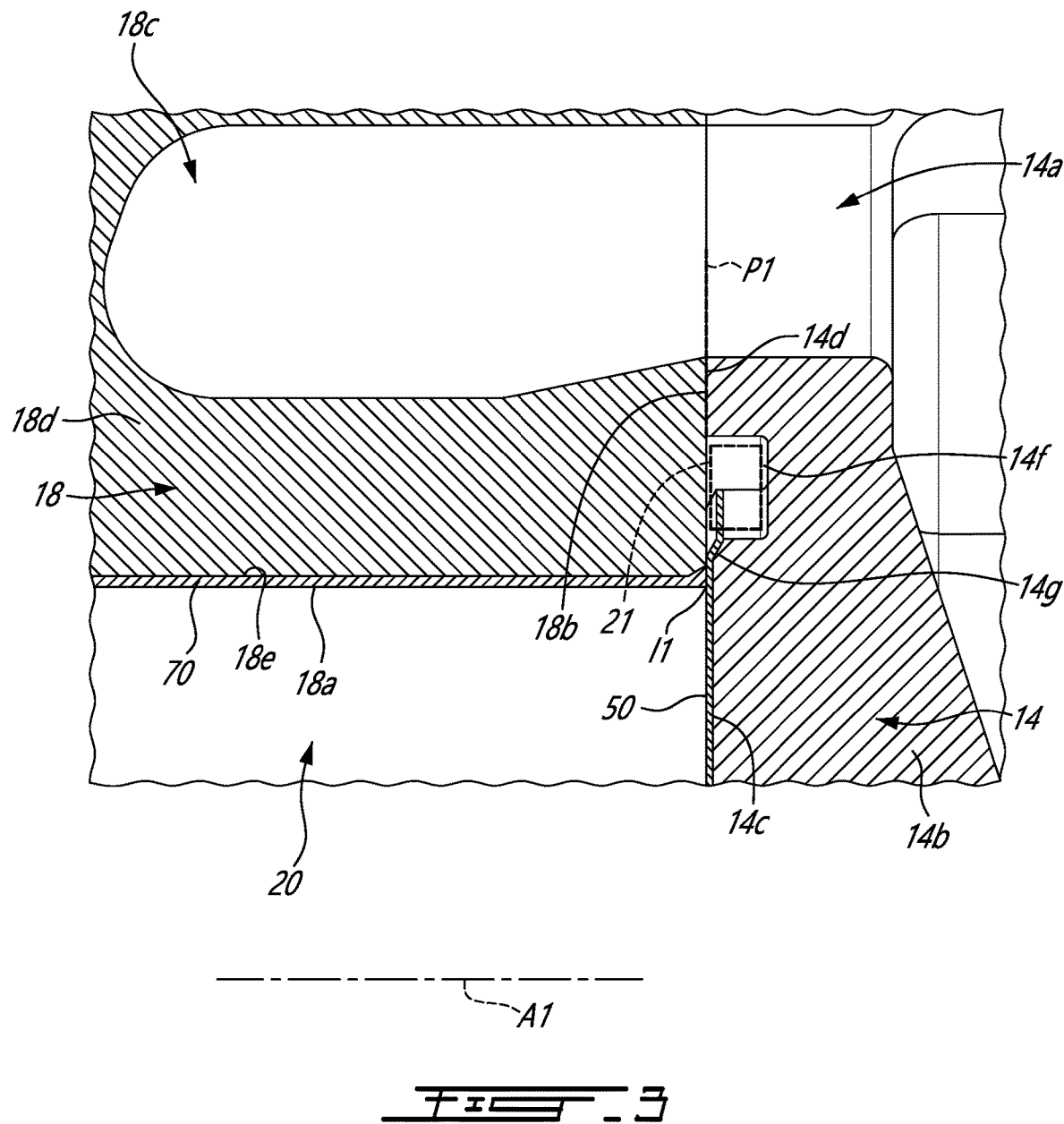
FIG. 3 is a cutaway view of the housing of the rotary internal combustion engine of FIG. 1 illustrating a portion of a peripheral wall of the housing and a portion of a side wall of the housing.

Referring to FIGS. 2-3, the peripheral wall 18 is sealingly engaged to the side wall 14. More specifically, a sealing engagement is created between the end face 18b of the peripheral wall 18 and the abutment section 14d of the side all 14. To this end, the side wall 14 defines a groove 14f that extends circumferentially all around the rotor cavity 20. The groove 14f is located outwardly relative to the intersection I1 between the side wall 14 and the peripheral wall 18 and extends from the abutment section 14d toward an opposite face of the side wall 14 and away from the end face 18b of the peripheral wall 18. The side coolant conduits 14a extend from the abutment section 14d and may run within a thickness of the side wall 14. The groove 14f receives a sealing member 21, such as an O-ring or a square composite section, or any other suitable sealing means, for creating a sealing engagement between the peripheral wall 18 and the side walls 14. The sealing member 21 may be compressed when the abutment section 14d of the side wall 14 is in contact against the end face 18b of the peripheral wall 18. In an alternate embodiment, the groove 14f is defined by the peripheral wall 18 and may extend from each of the end faces 18b toward the other of the end faces 18b. Both of the peripheral wall 18 and the side wall 14 may define a respective groove aligned with one another to receive the sealing member 21.

Typically, a coating is applied on the faces of the side walls that are in rubbing contact against the arc-shaped face seals 60 of the rotor 24, and against the end seals 54 and other seals. The coating is made of a material that is harder than a material of the core. Exemplary coatings include, for instance, silicon carbide, and chromium and tungsten carbides. A method of applying the coating includes machining a recess surrounded by a machined lip, which may have a width of about 0.080 inch. The machined lip is located inwardly of the groove that receives the sealing member. The recess may define a coating bath in which a coating material may be deposited. Care should be taken to avoid contact with an edge of the coating to avoid edge spalling problems. Coatings are weaker at their edges and those undesired contacts may result in some pieces of coating detaching from the core of the side wall. This is known as spallation. A core of the peripheral wall 18 may be similarly made of aluminum and the inner face 18a of the peripheral wall 18 may be defined by a similar coating having a hardness greater than that of a core of the peripheral wall 18. Intersection between the coating of the peripheral wall 18 and a coating edge of the coating of the side wall proximate the lip may be detrimental to a durability of the coating of the side wall.

Moreover, for aircraft applications, higher power density requirement may force the coolant passages of the side walls to be as close as possible to the combustion chambers to maximize heat extraction. This may lead to a narrower lip at the end of the coating bath and/or may lead to a shorter distance between the inner face 18a of the peripheral wall 18 and the coating edge of the coating on the side wall. Moreover, for aircraft applications, a durability requirement may be very high, in the order of thousands of hours, and the rotary engine 10 is expected to be operated at severe conditions. This pushes engineers to use harder coating for the peripheral wall 18. These harder coatings on the peripheral wall 18 may exacerbate the spallation of the coating of the side wall. The side wall 14 of the present disclosure may at least partially alleviate the aforementioned drawbacks.

Figure 4:
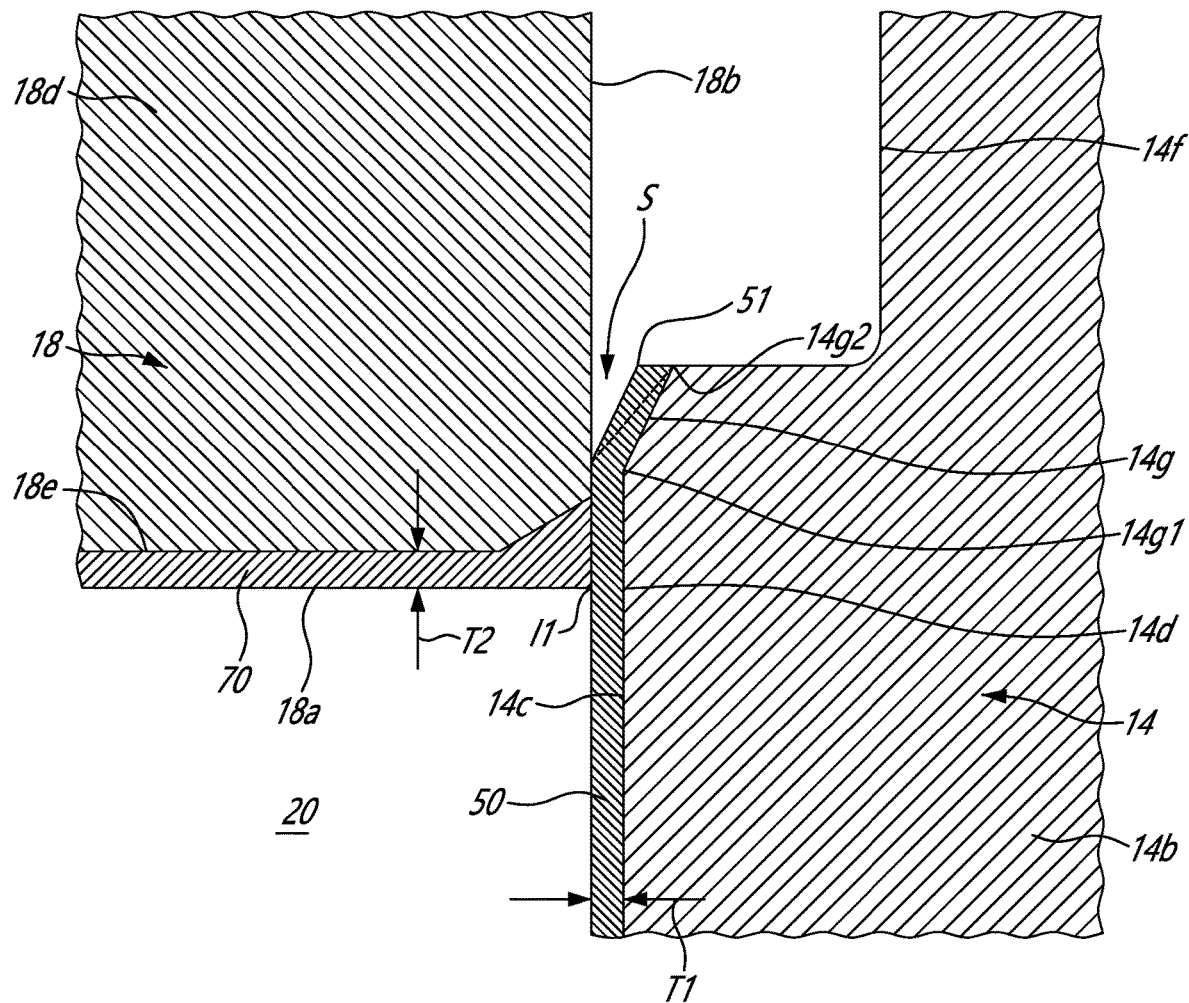
FIG. 4 is an enlarged cross-sectional view of the housing of the rotary internal combustion engine of FIG. 1 illustrating the portion of the peripheral wall of the housing and the portion of the side wall of the housing.

Referring to FIGS. 3-4, in the depicted embodiment, the abutment section 14d of the core 14b of the side wall 14 has a flared portion 14g that flares away from the end face 18b of the peripheral wall 18. The flared portion 14g extends away from a plane P1 containing a remainder of the abutment section 14d. The plane P1 may contain the cavity section 14c of the side wall 14. The flared portion 14g extends toward an opposite face of the side wall 14. The flared portion 14g is shown as being a chamfer, but may alternatively be a roundover or any other suitable shape. In the embodiment shown, the flared portion 14g ends at the groove 14f that receives the sealing member 21. Alternatively, the flared portion 14g may end at a step being substantially parallel to the plane P1; the step ending at the groove 14f and located between the flared portion 14g and the groove 14f.

As shown in FIGS. 3-5, a first coating 50 is deposited on the side wall 14. The first coating 50 covers the cavity section 14c of the core 14b of the side wall 14 and extends up to a coating edge 51 located on the abutment section 14d. In some cases, the first coating 50 may be partially over sprayed inside the groove 14f for manufacturing reasons. There might be some over spraying of the first coating 50 on the wall directly adjacent the coating edge 51 and located inside the groove 14f. The coating edge 51 is located on the flared portion 14g of the abutment section 14d. As illustrated in FIG. 4, a gap or spacing S is provided between the coating edge 51 and the end face 18b of the peripheral wall 18 such that the coating edge 51 is distanced from the end face 18b of the peripheral wall 18 by the spacing S. The coating edge 51 is therefore free of contact with the end face 18b of the peripheral wall 18. The first coating 50 may have a substantially uniform thickness T1 up to the coating edge 51. Or, in the alternative, the first coating 50 may tapers down toward the coating edge 51 as shown with a dashed line in FIG. 4. It may tapers down to zero in thickness. In other words, the thickness of the first coating 50 may decrease toward the coating edge 51. The thickness may decrease below its nominal thickness where it covers the flared portion 14g. The first coating 50 therefore follows the shape of the flared portion 14g defined by the abutment section 14d of the side wall 14. As shown in FIG. 5, the first coating 50 extends up to the groove 14f that receives the sealing member 21. A distance between the coating edge 51 and the inner face 18a of the peripheral wall 18 may be at least 0.1 inch. A nominal thickness of the first coating 50 may be about from 0.010 inch to about 0.015 inch. The expression "about" as used herein imply variations by plus or minus 10%. In operation, there may be some movements of the peripheral wall 18 relative to the side wall 14 because of thermal expansion. The inner face 18a of the peripheral wall 18 may become closer to the coating edge 51 when the rotary engine 10 is hot and running. A distance between the coating edge 51 and the inner face 18a of the peripheral wall 18 may be at least 0.1 inch when the engine is hot and running.

A second coating 70 is deposited on the peripheral wall 18. The second coating 70 defines the inner face 18a of the peripheral wall 18. The peripheral wall 18 as a peripheral core 18d defining a core inner face 18e facing toward the rotor cavity 20. The second coating 70 is deposited on the core inner face 18e of the peripheral core 18d of the peripheral wall 18. The second coating 70 is made of a material that is harder than a material of the peripheral core 18d of the peripheral wall 18. The peripheral core 18d and the core 14b of the side wall 14 may be made of the same material, such as aluminum or any other suitable material. The first coating 50 and the second coating 70 may be made of the same material such as silicon carbide or any other suitable material such as chromium and tungsten carbides.

As shown in FIG. 4, a thickness T2 of the second coating 70 is substantially uniform but for an end portion proximate the side wall 14. The thickness T2 is therefore greater where the second coating 70 contacts the first coating 50 than at a remainder of the second coating 70. The peripheral wall 18 proximate the intersection I1 defines a chamfer (or roundover) for receiving an additional thickness of the second coating 70 to limit the second coating 70 from flaking at this location. Typically, the second coating 70 may be grinded after deposition to produce a final running face with a surface finish meeting design requirements. The added thickness of the second coating 70 at this location may prevent the second coating 70 from chipping away during the grinding process.

Referring more particularly to FIG. 4, the flared portion 14g has a first edge 14g1 and a second edge 14g2 located outwardly of the first edge 14g1 relative to the rotation axis A1. The first edge 14g1 and the second edge 14g2 extend all around the rotor cavity 20. The first edge 14g1 is located inwardly of the inner face 18a of the peripheral wall 18. In the embodiment shown, the first edge 14g1 is located inwardly of the core inner face 18e of the peripheral core 18d of the peripheral wall 18. The first edge 14g1 is thus overlapped by the end face 18b of the peripheral wall 18. The first edge 14g1 is located between the inner face 18a of the peripheral wall 18 and an outer face of the peripheral wall 18; the outer face facing way from the rotor cavity 20. Therefore, a start location of the flared portion 14g, which corresponds to the first edge 14g1, is aligned with, or is overlapped by, the peripheral core 18d of the peripheral wall and may be offset from the second coating 70 deposited on the core inner face 18e of the peripheral core 18d. Thus, the first coating 50, located on the flared portion 14g, may be free of contact with the second coating 70. The second edge 14g2 is located at an intersection between the abutment section 14d and the groove 14f that receives the sealing member 21. The flared portion 14g of the abutment section 14d is therefore overlapped, or shielded, by the peripheral wall 18 and may be overlapped by the peripheral core 18d of the peripheral wall 18. The first edge 14g1 of the flared portion 14g may be offset from the core inner face 18e of the peripheral core 18d of the peripheral wall 18 and located inwardly from the core inner face 18e.

The disclosed side wall 14, including the disclosed flared portion 14g and the first coating 50, may increase a durability of the side walls 14 without compromising engine cooling efficiency, may allow bring the side coolant conduits 14a closer to the combustion chambers 32 by the removal of the machined lip; may avoid to have an edge of the peripheral wall 18 contacting the side wall 14 too close to the coating edge 51, which may reduce coating edge spalling risk; may eliminate the potential aluminum lip fretting and wear; may ease an initial coating grinding operation by eliminating the protruding coating "ridge" built on the top of the surrounding machined lip, which may otherwise force additional grinding passes; and may ease housing strip and recoat operation at overhaul by allowing to remove the coating over the full surface instead of a precise contouring to avoid re-machining the surrounding lip.

The present disclosure relates to the design of a lip-less rotary engine side wall coating edge. In the proposed design, the coating, which may be applied via plasma spray, HVOF, or any other suitable hard coating deposition method, goes up to the seal groove and terminates with a round edge or chamfer to create a natural contact "run-out". This may create a natural wrap around of the coating on the side wall, which may promote coating adhesion. The grit blasting operation, which is typically used as a pre-coating surface preparation, may be permitted while excluding an internal wall of the seal groove for ease of manufacturing. Masking techniques may be used for this grit blasting operation for shielding the internal wall of the seal groove. Moreover, the post-coating grinding operation may be specified with tight surface finish requirements only for the flat face that is in contact with the rotor 24 and the end faces 18b of the peripheral wall 18, thus excluding the run-out edge for similar manufacturing reasons.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A housing for enclosing a rotor of a rotary internal combustion engine, the rotor rotatable about a rotation axis, the housing comprising:
    a peripheral wall extending around a rotor cavity, the peripheral wall defining two end faces axially spaced apart from one another relative to the rotation axis and an inner face transverse to the two end faces, the inner face facing the rotor cavity and extending axially between the two end faces;
    two side walls respectively sealingly engaged to the two end faces of the peripheral wall, a core of a side wall of the two side walls having a core face, the core face having a cavity section facing the rotor cavity and an abutment section annularly extending around the cavity section, the abutment section facing an end face of the two end faces of the peripheral wall, the abutment section having a flared portion flaring away from the end face, the flared portion extending from a first edge to a second edge, the first edge overlapped by the end face; and
    a coating on the core face of the core of the side wall, the coating made of a material harder than a material of the core of the side wall, the coating covering the cavity section and ending at a coating edge located on the flared portion of the abutment section, the coating edge free of contact with the end face.

2. The housing of claim 1, wherein the end face extends from the inner face to an outer face, the outer face facing away from the rotor cavity, the first edge located between the inner face and the outer face and offset from the inner face.

3. The housing of claim 2, wherein the peripheral wall has a peripheral core and a second coating on the peripheral core, the second coating made of a second material harder than a material of the peripheral core, the inner face of the peripheral wall defined by the second coating.

4. The housing of claim 3, wherein the first edge of the flared portion is overlapped by the peripheral core, the first edge offset from an inner core face of the peripheral core, the second coating on the inner core face.

5. The housing of claim 1, wherein the peripheral wall has a peripheral core and a second coating on the peripheral core, the second coating made of a second material harder than a material of the peripheral core, the inner face of the peripheral wall defined by the second coating, the coating on the flared portion of the abutment section being free of contact with the second coating.

6. The housing of claim 1, wherein the side wall defines a groove extending from the abutment section away from the end face, the groove sized to receive a sealing member in the groove, the flared portion ending at the groove.

7. The housing of claim 6, wherein the coating extends up to the groove.

8. The housing of claim 1, wherein the flared portion is a chamfer or a roundover.

9. The housing of claim 1, wherein a thickness of the coating decreases toward the coating edge.

10. A side wall for a housing of a rotary internal combustion engine, the housing defining a rotor cavity, the side wall sized to be sealingly engaged to an end face of a peripheral wall of the housing, the side wall comprising:
   a core defining a core face, the core face having a cavity section for facing the rotor cavity and an abutment section for facing the end face, the abutment section extending outwardly from the cavity section and extending around the cavity section, a flared portion of the abutment section flaring away from a plane containing the core face; and
   a coating on the core face of the core of the side wall, the coating made of a material harder than a material of the core of the side wall, the coating covering the cavity section and ending at a coating edge located on the flared portion of the abutment section;
   wherein the side wall has a groove extending from the abutment section away from the plane containing the cavity section, the groove sized to receive a sealing member in the groove, the flared portion ending at the groove.

11. The side wall of claim 10, wherein the flared portion extends from a first edge to a second edge, the first edge offset from an intersection between the cavity section and the abutment section.

12. The side wall of claim 11, wherein the intersection between the cavity section and the abutment section is located such that the first edge is overlapped by a peripheral core of the peripheral wall of the housing.

13. The side wall of claim 10, wherein the coating extends up to the groove.

14. The side wall of claim 10, wherein the flared portion is a chamfer or a roundover.

15. The side wall of claim 10, wherein a thickness of the coating decreases toward the coating edge.

16. A rotary internal combustion engine, comprising:
   a rotor rotatable about a rotation axis; and
   a housing defining a rotor cavity, the rotor received in the rotor cavity, the housing having:
      a peripheral wall extending around the rotor cavity, the peripheral wall defining two end faces axially spaced apart from one another relative to the rotation axis and an inner face transverse to the two end faces, the inner face facing the rotor cavity and extending axially between the two end faces,
      two side walls respectively sealingly engaged to the two end faces of the peripheral wall, a core of a side wall of the two side walls having a core face, the core face having cavity section facing the rotor cavity and an abutment section extending around the cavity section and facing an end face of the two end faces of the peripheral wall, wherein the side defines a groove extending around the rotor cavity, the groove receiving a sealing member in the groove, the abutment section having a flared portion extending away from the end face and ending at the groove, and
      a coating on the core face of the side wall, the coating made of a material harder than a material of the core of the side wall, the coating covering the cavity section and ending at a coating edge, the coating edge distanced from the end face by a spacing defined between the abutment section and the end face.

17. The rotary internal combustion engine of claim 16, wherein the coating, at the flared portion, is free of contact with a second coating of the peripheral wall, the second coating made of a material harder than a material of a core of the peripheral wall, the second coating defining the inner face of the peripheral wall.

* * * * *